United States Patent
Skelton

(10) Patent No.: US 10,157,393 B2
(45) Date of Patent: *Dec. 18, 2018

(54) TRUST RATING METRIC FOR FUTURE EVENT PREDICTION OF AN OUTCOME

(71) Applicant: Right90, Inc., Austin, TX (US)

(72) Inventor: Dean Skelton, San Ramon, CA (US)

(73) Assignee: Right90, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,422

(22) Filed: Oct. 12, 2016

(65) Prior Publication Data

US 2017/0032392 A1 Feb. 2, 2017

Related U.S. Application Data

(63) Continuation of application No. 14/825,892, filed on Aug. 13, 2015, now Pat. No. 9,489,633, which is a continuation of application No. 14/189,256, filed on Feb. 25, 2014, now Pat. No. 9,123,001, which is a continuation of application No. 13/081,385, filed on Apr. 6, 2011, now Pat. No. 8,682,837.

(60) Provisional application No. 61/321,472, filed on Apr. 6, 2010.

(51) Int. Cl.
| | | |
|---|---|---|
| G06Q 30/02 | (2012.01) | |
| G06N 7/00 | (2006.01) | |
| G06N 5/04 | (2006.01) | |
| G06Q 10/04 | (2012.01) | |
| G06Q 10/06 | (2012.01) | |

(52) U.S. Cl.
CPC ......... *G06Q 30/0202* (2013.01); *G06N 5/04* (2013.01); *G06N 7/005* (2013.01); *G06Q 10/04* (2013.01); *G06Q 10/06393* (2013.01); *G06Q 30/02* (2013.01)

(58) Field of Classification Search
CPC ...... G06N 5/048; G06N 7/005; G06N 99/005; G06N 5/02; G06N 5/04; G06F 19/10–19/28; G06F 19/70–19/709; G06F 15/00–15/76; G06F 2015/761–2015/768; G06Q 30/0202; G06Q 10/04; G06Q 30/02; G06Q 10/06393
USPC ......................................................... 706/52
See application file for complete search history.

(56) References Cited

U.S. PATENT DOCUMENTS

| | | | | |
|---|---|---|---|---|
| 9,026,487 | B2 * | 5/2015 | Orumchian | G06F 17/30321 |
| | | | | 707/600 |
| 9,123,001 | B2 * | 9/2015 | Skelton | G06Q 10/04 |
| 9,489,633 | B2 * | 11/2016 | Skelton | G06Q 10/04 |
| 9,600,549 | B2 * | 3/2017 | Orumchian | G06F 17/30321 |
| 9,940,374 | B2 * | 4/2018 | Orumchian | G06F 17/30321 |
| 2007/0032392 | A1 * | 2/2007 | Yokoyama | C10M 145/14 |
| | | | | 508/466 |

(Continued)

OTHER PUBLICATIONS

ScienceDirect Accounting, Organizations and Society vol. 29, Issues 5-6, Jul.-Aug. 2004, pp. 447-471 The relations among environmental disclosure, environmental performance, and economic performance: a simultaneous equations approach.*

(Continued)

*Primary Examiner* — Michael B Holmes

(57) ABSTRACT

In at least one embodiment, a trust rating system and method provide a precise and accurate, structured (yet adaptable and flexible), quantifying way of expressing historical trustworthiness so the user or decision maker can make more informed decisions on the data or information being evaluated.

64 Claims, 11 Drawing Sheets

(56) References Cited

U.S. PATENT DOCUMENTS

| | | | | |
|---|---|---|---|---|
| 2007/0288414 | A1* | 12/2007 | Barajas | G06N 7/00 706/46 |
| 2009/0150368 | A1* | 6/2009 | Orumchian | G06F 17/30321 |
| 2011/0087627 | A1* | 4/2011 | Schmid | G06N 3/0454 706/21 |
| 2012/0166383 | A1* | 6/2012 | Orumchian | G06F 17/30321 707/600 |
| 2014/0316861 | A1* | 10/2014 | Skelton | G06Q 10/04 705/7.39 |
| 2015/0066838 | A1* | 3/2015 | Orumchian | G06F 17/30321 707/602 |
| 2015/0161222 | A1* | 6/2015 | Orumchian | G06F 17/30321 707/602 |
| 2015/0347921 | A1* | 12/2015 | Skelton | G06Q 10/04 706/52 |
| 2017/0154381 | A1* | 6/2017 | Orunnchian | G06F 17/30321 |

OTHER PUBLICATIONS

Node Trust Prediction Framework in Mobile Ad Hoc Networks Hui Xia; Guo-Dong Wang; Zhen-Kuan Pan 2016 IEEE Trustcom/BigDataSE/ISPA Year: 2016 pp. 50-56 IEEE Conferences.*

Understanding Decision-Support Effectiveness: A Computer Simulation Approach Jeffrey E. Kottemann; Kathleen M. Boyer-Wright; Joel F. Kincaid; Fred D. Davis IEEE Transactions on Systems, Man, and Cybernetics—Part A: Systems abd Humans, vol. 39, No. 1, Jan. 2009 pp. 57-65.*

High-Level Factors Affecting Global Availability of Online Government Services Kathleen M. Boyer-Wright; Jeffrey E. Kottemann Proceedings of the 41st Annual Hawaii International Conference on System Sciences (HICSS 2008) Year: 2008 pp. 199-199 IEEE Conferences.*

Amendment Under 37 C.F.R. Section 1.312, as filed in U.S. Appl. No. 14/825,892 dated Sep. 13, 2016, pp. 1-15.

Corrected Notice of Allowability and Examiner's Proposed Amendment dated Aug. 25, 2016, dated in U.S. Appl. No. 14/825,892, pp. 1-23.

Notice of Allowance dated Jul. 6, 2016, mailed in U.S. Appl. No. 14/825,892, pp. 1-13.

Response to Non-Final Office Action dated Nov. 24, 2015, as filed in U.S. Appl. No. 14/825,892 on May 24, 2016, pp. 1-19.

Non-Final Office Action dated Nov. 24, 2015, mailed in U.S. Appl. No. 14/825,892, pp. 1-24.

Communication Pursuant to Article 94(3) EPC dated Jul. 3, 2017, mailed in European Application No. 11720624.3, pp. 1-8.

* cited by examiner

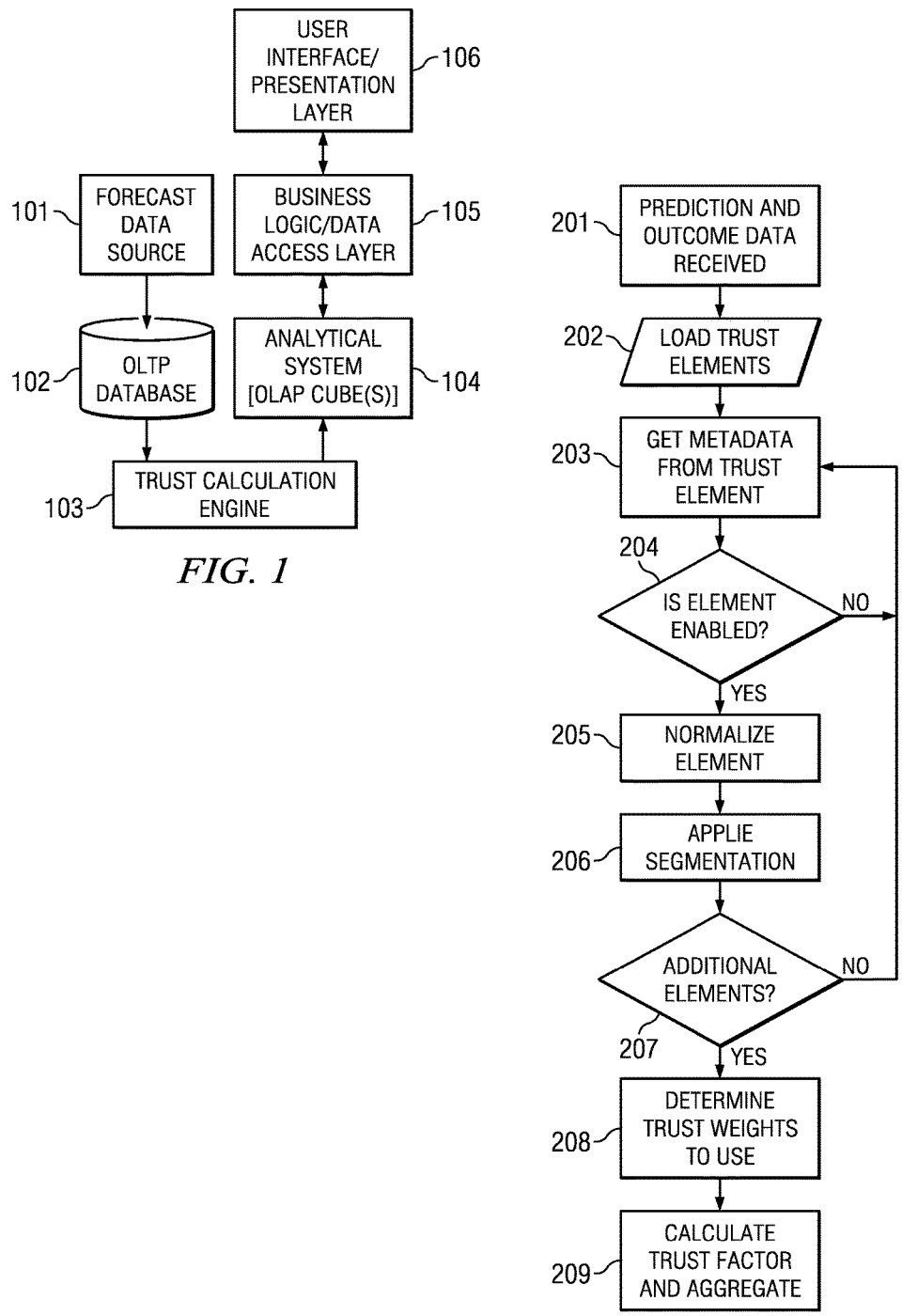

| Trust Drill Down | | | | | Rows 100 ▽ | Hide Tr Details Return to Dashboard ✕ | | | |
|---|---|---|---|---|---|---|---|---|---|
| Region | Current Forecast | Actuals | AOP | Current Forecast ... | AOP LTG | Tr | Ac | Bi | Cp |
| Region365 | $100,000 | $50,000 | $100,000 | $50,000 | $50,000 | 8.0 | 10.0 | 0.0% | 0.0 |
| Region10 | $1,597,173 | $798,586 | $1,642,473 | $798,586 | $843,886 | 7.5 | 8.9 | -0.1% | 0.0 |
| Region26 | $808,863 | $404,431 | $808,863 | $404,431 | $404,431 | 7.4 | 9.4 | 9.2% | 0.0 |
| Region59 | $106,325 | $53,162 | $106,325 | $53,162 | $53,162 | 7.2 | 9.0 | -16.6% | 0.0 |
| Region23 | $46,887 | $23,443 | $46,887 | $23,443 | $23,443 | 7.0 | 8.4 | 9.7% | 0.0 |
| Region36 | $1,747,306 | $873,653 | $1,777,076 | $873,653 | $903,423 | 5.3 | 8.2 | 47.5% | 0.0 |
| Region50 | $367,822 | $183,911 | $456,272 | $183,911 | $272,361 | 4.7 | 7.7 | 60.9% | 0.0 |
| Region80 | $366,700 | $183,350 | $372,000 | $183,350 | $188,850 | 2.7 | 6.7 | 1,216.5% | 0.0 |
| | $5,143,778 | $2,571,889 | $5,309,898 | $2,571,889 | $2,738,009 | 6.9 | 9.2 | 17.3 | 0.0 |

| FIG. 7A |
| --- |
| FIG. 7B |

FIG. 7 right 90 | Trust Analytics ▼ | D     Setup Help Support Feedback Switch User Logout Default View Current Forecast - Quarter 1, 2010 [change]    Rows 100 ▼    Hide Tr Details    Return to Dashboard ✗    Periodically Updated Trust Drill Down

| Product Family | Current... | Actuals | AOP | Current... | AOP LTG | Tr | Ac | Bi | Cp |
|---|---|---|---|---|---|---|---|---|---|
| Product Family10014 | $145,828 | $72,914 | $145,828 | $72,914 | $72,914 | 7.2 | 9.0 | -13.5% | 0.0 |
| Product Family10003 | $498,787 | $249,393 | $498,787 | $249,393 | $249,393 | 6.5 | 8.2 | 18.8% | 0.0 |
| Product Family711 | $168,014 | $84,007 | $168,014 | $84,007 | $84,007 | 6.1 | 8.2 | 31.7% | 0.0 |
| Product Family424 | $1,128,935 | $564,467 | $1,128,935 | $564,467 | $564,467 | 5.8 | 8.6 | 38.8% | 0.0 |
| Product Family583 | $90,750 | $45,375 | $90,750 | $45,375 | $45,375 | 5.2 | 8.0 | 49.4% | 0.0 |
| Product Family10407 | $0 | N/A | N/A | N/A | N/A | 3.5 | 4.7 | -62.8% | 0.0 |
| Product Family574 | $0 | N/A | N/A | N/A | N/A | 3.4 | 2.3 | -50% | 0.0 |
| Product Family405 | $2,361,654 | $1,180,827 | $2,168,174 | $1,180,827 | $987,347 | 3.2 | 7.1 | 93.2% | 0.0 |
| | $5,143,778 | $2,571,889 | $5,309,898 | $2,571,889 | $2,738,009 | 6.9 | 9.2 | 17.3 | 0.0 |

Trust Factor

Total    6.9

Ac 2 | Accuracy    9.2 out of 10

Bi 3 | Bias    − 17.3% +

Cp 4 | Completeness    0.0 out of 10

Cn 5 | Consistency

Weighting    Comparisons

TRUST RATING METRIC FOR FUTURE EVENT PREDICTION OF AN OUTCOME

CROSS-REFERENCE TO RELATED APPLICATION

This application claims the benefit under 35 U.S.C. § 119(e) and 37 C.F.R. § 1.78 of U.S. Provisional Application No. 61/321,472, filed Apr. 6, 2010, and entitled "Trust Rating Metric for Future Event Prediction of an Outcome Based on Objective Structured Historical Information and Time-Offset Value," and is incorporated by reference in its entirety.

BACKGROUND

Currently when systems or people try to gauge the trustworthiness of predicted data like sales forecasting information, unstructured and subjective methods are used to reach conclusions. Gut feel and rudimentary surveying of results is often used to develop an opinion as to whether the person or system that provided the predictive forecast data is trustworthy and whether the data should be acted on or not. These methods do not provide any structure by which repeated understanding of trustworthiness can be analyzed over time. Additionally, these conventional systems, methods, and techniques are extremely subjective. What one person may deem as a high trust may not be necessarily the same as another.

BRIEF SUMMARY OF THE DRAWINGS

FIG. 1 is an illustration showing an embodiment of a system architecture.

FIG. 2 is an illustration showing an embodiment of a process flow for how data is moved into the trust rating system and method and how Trust is calculated.

FIG. 5 is an illustration showing an embodiment of an aggregate view of Trust data for a given category or dimension at a hypothetical level of Region in a hierarchy, presented in tabular form.

DETAILED DESCRIPTION

Introduction

Figure 3:
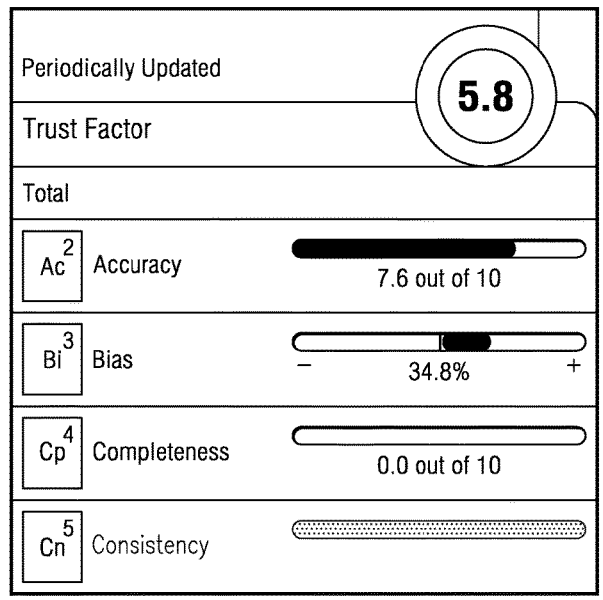
FIG. 3 is an illustration showing an embodiment of how Trust Factor and elements are displayed.

In at least one embodiment, a trust rating system and method provide a precise and accurate, structured (yet adaptable and flexible), quantifying way of expressing historical trustworthiness so the user or decision maker can make more informed decisions on the data or information being evaluated.

A Trust Factor rating is provided that represents the historical trustworthiness of an individual or system that is responsible for generating predictive or forecasted data over time. The prediction is a numeric representation of some future happening that is quantifiable like forecasting the product quantity that might be sold in a future month or perhaps what price it would be sold for. The predictive data is necessarily followed, at some point in time, by an outcome. As time progresses toward the point in time of the outcome the prediction can change. A lead-time variable is defined to establish the point of relevance where-by any further change in prediction is irrelevant to the comparison to the outcome. The Trust Factor is a composite representation of a number of elements intended to quantify the historical trustworthiness of the predictor. The composite notions are, but not limited to, Accuracy, Bias, Completeness and Consistency and are weighted in importance to their overall relationship to trustworthiness. All of which can be derived from the predicted and outcome data over time.

In at least one embodiment, a computer-implemented trust rating system and method calculates and provides a trust rating that represents the trustworthiness of a predictor or forecast. In one non-limiting example of the system and method, the system and method may advantageously include one or a combination of any two or more of the following: (a) a future measure or outcome being predicted or forecast, (b) the time over which the prediction is being measured, (c) the lead-time over which the prediction is valid, (d) the established derived elements of Trust or trust factor and related weightings, (e) the measured change in the predicted or forecast values over time, (f) the received outcome data over time, (g) the calculated or derived elements, (h) the calculated trust rating, such as a Trust Factor, as defined by the weighting of the derived elements which may also be displayed, (i) trending information to tell the trust rating system and method whether the predictor is getting better or worse at each component over time. The system and method may also include a segmentation scheme that allows for defining what is deemed untrustworthy or trustworthy in a flexible fashion, and/or an aggregation capability that allows for analysis of the Trust Factor and elements through categories or hierarchies. Other examples of the method and system for implementing the method may have fewer of these features some of which are optional.

In at least one embodiment, the notion of Accuracy and Trust described below take into account relevant data and how the data changes over time. For example, in a forecasting system it is not unusual for a particular forecasted value to change significantly over the course of some period of time. Of course, in a simple scenario, a system could simply track the current value of the forecast item, but a more sophisticated system and method uses the forecasted value as it existed at some point in the past. In at least one embodiment, simply recording the value at the end of some fixed time period, e.g. monthly or quarterly, is inadequate to establish a trust rating, such as a trust factor or a trust factor rating. Depending on the company or user base involved the specific need of time granularity may change greatly depending on the problem being addressed. In at least one embodiment, the trust rating system and method have flexibility and configurability to accommodate such changes. Referring again to the forecasting example, it may be the case that a forecast value changes on a daily basis but in order to accurately reflect accuracy, the trust rating system and method look at the forecast value 21 days prior to when the outcome is achieved. In at least one embodiment, the trust rating system and method understands and tracks the change at that point in time 21 days prior to outcome. But if the user changes their need and, for example, requires the period to be 23 days prior to outcome, the trust rating system and method, in at least one embodiment, is flexible enough to be configured to track that data to the granularity necessary to handle both a 21 day look-back and a 23 day look back.

Thus, in at least one embodiment, the trust rating system and method employs a delta based system of storing data. Rather than storing current or net values at points in time, the trust rating system and method stores the change in the forecast value when that change occurs that achieves the net required. If the user wants to change a value of 100 to 110, the trust rating system and method stores the +10 value at the point in time the change was made. Doing this allows the trust rating system and method to simply add up all the delta values to a particular point in time that is needed. Most conventional systems struggle with this type of requirement. If we take Microsoft Excel™ as an example, each cell in the spreadsheet records the current value so if it changes it changes for good. In order to preserve what the value was before the change one really needs to save a copy of the spreadsheet before the change but then rebuilding "as of" notions becomes cumbersome and very clumsy. Referring to the present trust rating system and method, by storing deltas it is similar in concept to allowing for granular history of each cell in a spreadsheet and an inherent ability to go back and reconstruct the spreadsheet as it existed at some point in the past. This generalized example can be easily extrapolated to construct any type of accuracy calculations discussed herein. If the cell is empty it is deemed zero. If a user changes it to 100 on Tuesday, the trust rating system and method records +100 on that day. If the user changes the value to 110 on Wednesday the trust rating system and method records the +10 and so on. Adding up the deltas up to and including Tuesday yields 100, doing it up and including Wednesday yields 110.

In at least one embodiment, the system and method include a Trust Factor rating that represents the trustworthiness of a prediction. The prediction is a quantifiable numeric representation of some future event, and the prediction can change as the outcome of that event approaches. In at least one embodiment, the Trust Factor includes elements that can be derived from the current and past-predicted data and past outcome data, and each element is weighted in importance and relevance to the overall notion of trust. Each analyzer may have a different notion of what element is more important than the other. Thus, in at least one embodiment, the system and method is capable of allowing a user to weight one or more elements in accordance with an importance as specified by the user. In at least one embodiment, the system and method normalizes each element from past and present data and scores each element. Weightings applied to reach a number that can be represented on a scale, such as a fixed scale, e.g. 0 to 10 representing trustworthiness. In at least one embodiment, the system and method factors in a lead-time notion to the element measurements to define a period of time by which the prediction is relevant.

An example usage of the rating system is in the case of a company or corporate entity that manufactures product to be sold by a group of sales people. Typically, one or more forecasters are tasked with the job of forecasting the quantities and prices for sales of product in the future. This prediction can be made some time in the future of the sale actually happening. The prediction can precede the event anywhere from a few months in advance to years. In at least one embodiment, when gauging the trustworthiness of the forecaster, the system and method evaluate how successful the prediction is, taking into account the fact that products typically take time to build. If it takes 6 weeks to build it is advantageous to have a good prediction of the sales outlook at that time. If the trust rating system and method assesses trustworthiness, this lead-time should be factored in so that when the trust rating system and method or a user measures the trustworthiness of the prediction, the trust rating system and method assesses trustworthiness at the time before a commitment to action on that prediction. As such, when trying to quantify trust, the trust rating system and method calculates its meaning at that time. For a generic solution, in at least one embodiment, the system and method are capable of configuring this ability from customer to customer or from prediction to prediction using, for example, user input data.

In addition, there are different factors that can contribute to an objective notion of trustworthiness. Accuracy, bias, consistency and completeness are among them but different situations may call for the addition of new ones or the omission of others. Some additional factors used for calculation could in fact be external to the system altogether such as exchange rate information or perhaps weather forecasts.

Figure 11:
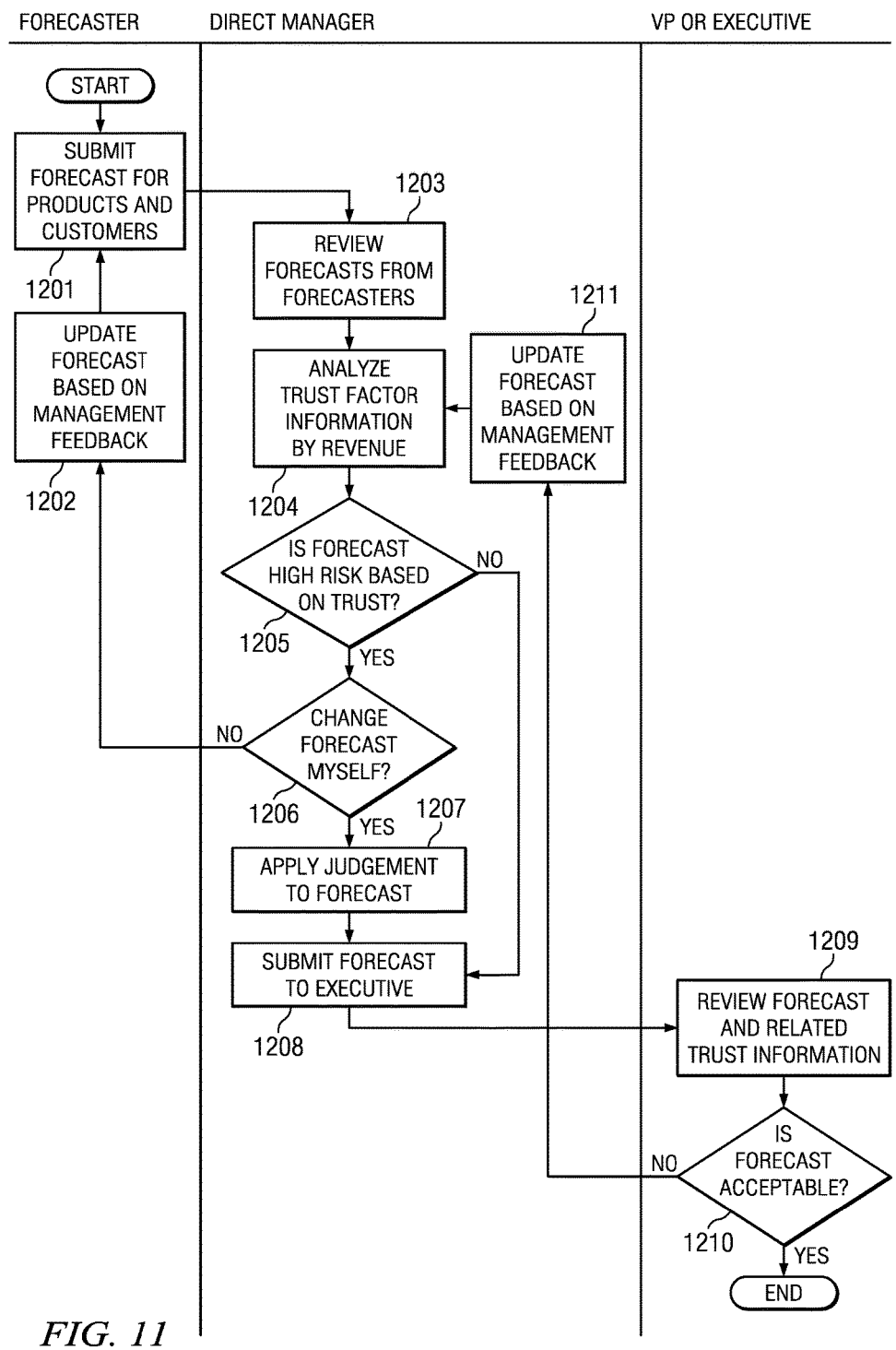
FIG. 11 is an illustration showing relationships between a forecaster or analyst, a first level or direct manager, and a second level or executive manager.

To extend the example, trustworthiness in a forecasting process can manifest itself in a feedback process in a risk assessment scenario as illustrated by the process flow in FIG. 11. Here are three roles, the forecasters who enter the base predictive data, the manager who vets their forecasts and the Vice President or Executive that oversees and commits the forecast to the company. In this example, the process is as follows:

Step 1201—Forecaster submits prediction to the manager as a forecast for specific Products and Customers but other categories may be necessary, it depends on the type of forecast being collected Step 1203—Manger reviews the forecast information and changes that have been made.

Step 1204—Manager overlays the Trust Factor information and associated elements and analyzes the forecast revenue looking for areas that have a low trust score. This represents risk in the forecast.

Step 1205—If the forecast is high risk and the associated revenue is large the manager may not approve this scenario. If this is not the case the manager can submit the forecast to the Executive at 1208.

Step 1206—if the forecast is deemed to contain too much risk the manager can either adjust the forecast with his or her own judgment or request that a forecaster adjust the forecast based on the feedback given regarding the risk profile observed.

Step 1202—if the manager rejects the forecast back to the forecaster, the forecast can be updated accordingly based on the feedback from 1206 and resubmitted via 1201.

Step 1207—if the manager assumes the responsibility for changing the forecast, they can enter their own judgment as it relates to the observed risk in the forecast.

Step 1208—at this point the manager submits the forecast to the Executive which in some regards could be seen as a commitment to the forecast.

Step 1209—the executive reviews the forecast in much the same way as the manager albeit probably at a less detailed level digesting both the forecast values but also taking into account the trust information and perceived risk.

Step 1210—in some cases the forecast may be deemed at this level to be unacceptable either because the forecast falls short of expectation or that the risk profile as highlighted by the trust information is unacceptable.

Step 1211—based on executive feedback, the forecast can be updated again by the manager and the feedback process between the manager and the forecaster can be repeated.

Therefore it will be apparent that in one example of a process according to an example of the invention, there is a method that includes the steps (some optional) of: (A) receiving (e.g., by a computer or a server computer) at least one initial future forecast prediction data from an external forecaster for a future event or condition that has not yet occurred;

(B) communicating the at least one initial future forecast prediction data to a first level manager, and optionally communicating any changes to the at least one initial future forecast prediction data to the first level manager, the first level manager being at a higher responsibility relative to the forecaster and an executive level manager at a higher responsibility relative to the first level manager;

(C) reviewing the at least one initial future forecast prediction data (e.g., by the first level manager);

(D) overlaying (e.g., by the first level manager) a trust factor information and associated elements or components;

(E) analyzing the at least one initial future forecast prediction data and any changes to the initial future forecast prediction data (such as forecast revenues or sales or other event outcome) to identify values, predictions, and/or forecasts that have a trust factor score that has a magnitude relationship relative to a predetermined trust factor score (or a trust factor score that is too low or below a predetermined or dynamically determined trust factor score threshold) that indicate a forecast risk (or a forecast profile) in the future forecast prediction data;

(F) determining if the identified risk is greater than or less than a risk threshold, the risk threshold optionally being adjusted or dynamically determined based on an impact on an associated performance metric (or revenue or sales metric;

(G) if the forecast risk is less than the risk threshold in view of the impact of an inaccurate forecast, then approving the forecast and communicating the forecast to an executive manager for further consideration, but if the risk is greater than the risk threshold in view of the impact of an inaccurate forecast, then either (i) sending the forecast back to the forecaster with first level manager feedback comments and a request that the forecast be updated based on the first level manager feedback; or (ii) the first level manager updating/revising the forecast based on the first level manager's judgment (in combination with other facts and knowledge or research);

(H) when the forecast is sent back to the forecaster for update/revision, receiving an updated or revised forecast in response to the first level manager feedback and request for update/revision;

(I) when the forecast is updated/revised by the first level manager, receiving an updated or revised forecast from the first level manager, the updated/revised forecast being either a change in the forecast or a comment attached to the forecast to explain/justify the forecast and the risk, or a combination of a change in the forecast and a comment attached to the forecast to explain/justify the forecast;

(J) iteratively revising the forecast by the forecaster and/or the first level manager until the risk based on trust is determined to be within acceptable limits, and then communicating the forecast including any updates/revisions to the forecast to the executive manager, the communicating of the trust factor reviewed and possibly updated/revised forecast to the executive manager representing a commitment of the first level manager to the forecast;

(K) analyzing the committed forecast (e.g., by the executive manager) using the trust factor, including reviewing the forecast value(s), the trust information, and the identified risk;

(L) determining that the committed forecast is unacceptable for a reason, the reason being one or a combination of two or more selected from (i) the forecast is not within an acceptable forecast value range for the forecast event (or the forecast falls short of expectations), (ii) the risk profile (as highlighted by the trust information) is unacceptable;

(M) if the committed forecast from the first level manager is unacceptable, then communicating the forecast with executive feedback including executive manager feedback comments, to the first level manager for updating/revision by the first level manager and/or for updating/revision by the forecaster; and (N) if the committed forecast from the first level manager is acceptable then identifying the executive manager approved forecast as the final forecast that has passed the trust factor analysis with acceptable trust risk and acceptable performance metric.

Specialize processing engines may be provided and configured to implement each of the above described process steps, either alone or in combination within a single or smaller set of engines.

Another example is evaluating analyst's predictions regarding stocks. It is more advantageous to know or have a sense of what a stock or financial instrument is going to do in advance of a particular date. The more of a horizon you have, the greater the advantage. When gauging the trustworthiness of a stock predictor a user or the trust rating system and method can do so at different lengths of time. In at least one embodiment, different notions contribute to the overall trustworthiness that are different than, for example, sales forecasting. It may be the case that only accuracy of the prediction and bias of the prediction are important while consistency and completeness are not. It may also be the case that addition notions be factored into the notion of trustworthiness. In at least one embodiment, this flexibility exists in the solution.

It may be appreciated in light of the description provided herein that the manner in which the trust factor and/or its individual or combined components may trend over time may also be valuable or provide valuable input or insight for forecasting. For example, the evolution or behavior or trending of the trust factor over a period of time for a particular analyst/predictor or combination of predictor/analyst and product, may identify an optimum or near optimum, or at least really good prediction situation or sweet spot, where the prediction might be expected to be quite valuable. For example, it may be valuable in that it has high accuracy or is valuable respective of one of the other trust factor components, or combination of components.

Management might for example be able to look at trust factors and predictions or forecasts for a particular analyst (or set of analysts) where the predictions or forecasts were may every week with lead times (time in advance of the forecast event) of 6-weeks, 5-weeks, 4-weeks, 3-weeks, 2-weeks, 1-weeks, and identify one particular analyst as being particularly trust worthy at 1-3 weeks, but not as trustworthy for periods of time greater than 3 weeks; and, identify a second particular analyst that is particularly good and trust worthy at forecasting at 4-8 weeks in advance of the event, but not particularly good or just average at more near term predictions. Other forecasters, predictors, or analysts may also outperform others for particular forecasting scenarios. These outperforming predictors or analysts might be product or industry specific. These outperforming predictor analysts may also have other factors that need to be taken into account, such as an analyst or predictor that has a very trustworthy record for yearend predictions but average or below average the rest of the year.

Looking at these trends or performance indicators would be relevant to predicting all sorts of events or non-events, even including manufacturing or supply events, and even including manufacturing situations where manufacture of an article needs to commence in a time frame outside of the outperforming predictor is accurate, but within a manufacturing scenario where the manufacturing timelines or quantities can be modified as more trustworthy predictions become available.

For example in a manufacturing company making widgets, even though the lead-time for manufacturing the widgets is 6 weeks, one may want to look at the subsequent Trust Factor scoring for predictors that are accurate at periods inside the 6 weeks lead time (for example, within the 1-3 week time frame). This may allow for a more informed exception process in that even though one is inside the manufacturing lead-time, one may want to adjust plans and incur additional costs based on a highly trustworthy adjusted forecast, such as to add another production shift or to scale back the production so as not to overproduce widgets that cannot be sold.

As another example a person who predicts the over and under of a sporting event score could be scored for trustworthiness in a similar way. The more in advance of the sporting event you can gauge the outcome, the better advantage you can take of the odds established on the outcome. When looking at the historical trustworthiness of the predictor it may be necessary to calculate the notions of accuracy and whatever else is deemed important several weeks prior to the event. As such, the trust rating system and method or a user can determine a more objective score as to whether the predictor is historically trustworthy or not. Again, this notion of time in advance of event may need to be configurable based on the type of event being measured.

The trust factor is not limited in its application to only persons doing the prediction. In at least one embodiment, it may be important to further dissect the prediction and look at the calculated trust factor for what the prediction is for. For example, if a forecast is forecasting products it may be that the forecasted overall trust factor is good but upon inspection, it could be that the trust factor for production of two certain products is poor but the aggregation of all the predictions hid that notion. Thus, in at least one embodiment, the trust rating system and method is capable of dissecting or slicing the trust factor or reverse aggregate.

In at least one embodiment, the trust rating system and method compares and contrasts the trust factor ratings. In at least one embodiment, the application of the trust factor in the trust rating system and method allows for the comparison of elements in the system. It could be as simple as forecaster A compared to forecaster B or perhaps as complex as comparing forecaster A to the top 10 of other forecasters in the system using the trust factor as the scoring mechanism.

In at least one embodiment, the trust factor is a metric that can permeate the system itself or be used outside of the system in that when items are displayed (for example on a monitor) for which a trust factor could be calculated, it may be advantageous to show the trust factor and related components for that item in conjunction with what is being displayed. By example, in a forecasting system for sales forecasting data, typically the user is presented with tools to manage things like products and regions and the users or forecasters. In at least one embodiment, the trust rating system and method causes the related trust factor to be displayed in those screens as well as contextual information. In addition, it is not unusual for forecasting systems of this nature to be integrated with or at least compliment other systems like Customer Relationship Management system. Thus, in at least one embodiment, the trust rating system and method provides the trust factor information to those systems so that a user may see the trust factor data when viewing these items in those systems as well.

Overview of the Trust Factor Rating

The Trust Factor of a prediction may be a measure or metric such as a numerical value between a first rating range value and a second rating range value. Conveniently, the trust factor may be a value between 0 and 10 (or between 1 and 10) or any other scaled range for such a value. It may be a linear scale or a non-linear scale. The trust factor indicates the calculated historical trustworthiness of a system or person generating numeric predicted values over time. 10 would represent the highest level of historical trust while 0 would represent the lowest. The Trust Factor is generated periodically as the measured outcomes of the predictions are recorded. The Trust Factor is a value derived from a weighted group of sub-measurements called the elements of trust. Some of these elements of trust use a notion of lead time or offset to define the period by which changes to the prediction are relevant leading up to the point where the outcome is captured. An example displaying of the Trust Factor rating can be seen in FIG. 3.

Some non-limiting examples of candidate elements or components of the trust factor are now described. Some of the described elements are optional. In one example, the Trust Factor is a derived from the normalization and weighting of a number of calculated measurements that are derived from the predicted and outcome data. These elements are defined by the user analyzing the trustworthiness and can be extended to include additional element calculations. For convenience, the basic elements are, but not limited to, accuracy, bias, completeness and consistency. In many cases time plays a part in these elements. An offset value for time is used by the trust rating system and method to handle this.

An example of these elements as potentially displayed can be seen in FIG. 3.

Time Offset Value is a concept that pertains to the length of time in advance of an event or actual outcome that a forecast or prediction about the outcome is made. An accurate prediction or forecast that is made well in advance (for example 3 months in advance) of an outcome is in principle more important and valuable than an equally accurate prediction that is made a shorter period of time (for example 1 week in advance) in advance of the outcome. It may even be true that a somewhat less accurate outcome made well in advance of the event or outcome is more valuable than a more accurate prediction made a shorter period of time in advance. For example, if the actual outcome is 20 units, and the prediction made 3 months in advance was 17 units but the outcome predicted 1 month in advance is 18 units, the earlier prediction may have more value and utility even though it is less accurate. The idea of the time offset value is to give the trust factor more credibility or higher weighting or meaning when a forecaster predicts accurately a longer period of advance of the event or outcome.

In at least one embodiment, the trust rating system and method allows for a certain level of trust factor modeling whereby the trust rating system and method are capable of allowing for the use of different trust factor calculations at different points in time or different offsets. The previous paragraph opens up the possibility that this could be useful in that the perception of trust is somehow different at certain points in time. The notion that lower accuracy at a longer horizon suggests perhaps that the system could use some kind of normalization so that the trust factor calculation takes this into account.

It may also be advantageous to include factors that take into account multiple Time Offsets for trending and other types of analysis. In this case the inventive system and method may advantageously include factors that provide for inclusion of predictor velocity and predictor direction of change measures or metrics over periods of time. Relevant analysis may then take into account how quickly do they achieve a maximum or optimum Trust Factor, how long after the optimum Lead Time is the maximum Trust Factor achieved, and/or what is the minimum Trust Factor over a range of Lead Times?

When dealing with predicted data that, in at least one embodiment, invariably implies an outcome, the notion of time and its relationship to this data should be understood.

An example is now described. A sales person predicts in January that 10 units of product x will be sold in May. This is a prediction 5 months prior to the outcome. It may be the case that in February this insight changes and the prediction now become 20. Time continues to progress and on the last day of April the prediction is changed to 15 and on the next day the sales was made and the outcome was in fact 15. Was this individual accurate?

In most cases there is a lead-time to react to changes in prediction. In this case, for example, product x takes 2 weeks to make so in order to judge a prediction as accurate or not it may be necessary to take the prediction as it existed 2 weeks prior to the outcome to determine this.

In the example this would have in fact been 20 and not 15 making the sales person somewhat inaccurate in the prediction.

This is what is to be known as the time offset value. It represents a period of time, such as a period of days, weeks, months, or years (or any other period of time or delay between the forecast or prediction and the event outcome) prior to the recording of the outcome by which certain trust measurements should be calculated. It is a configurable value and in many cases different things utilize different offsets or perhaps multiple offsets for deeper analysis. It may be the case for the same forecaster that a second product, product y, has a lead-time of 4 weeks because it takes that much longer to build. In at least one embodiment, when calculating an aggregate trustworthiness of this forecaster for the two products this dual notion of offset should be understood.

Accuracy represents variance comparison of the prediction to the outcome value. By example, if a sales person predicts that in May they will sell 10 units of product x and when may arrives they actually did sell 10 units. They are 100% accurate. Any variance to the outcome however can be calculated as an absolute value departure away from 100%. Should the outcome have been 9 they could be said to have been 90% accurate. In other words they achieved a lower calculated accuracy. There are many possible metrics for accuracy but basically, accuracy is a difference between the actual outcome and the predicted or forecast outcome. It may be scaled or normalized in a number of different possible ways. Furthermore, it may or may not matter if the predicted value is higher or lower than the actual outcome. If the positive or negative nature (higher or lower) is not an issue, then the absolute value (ABS) or magnitude of the difference may be utilized. If knowing and taking into account that the forecaster or forecast is frequently over estimating or underestimating, then the sign of the difference may be included in the accuracy component calculation.

In one non-limiting example, the accuracy may be represented by: sense accuracy is:

$$\text{Accuracy}=1-\text{ABS}((P-O)/(P+O)),$$

where P is prediction, O is outcome.

Of course, this particular non-limiting example does not factor in the notion of the time-offset value as does an alternative example described elsewhere herein. If lead-time (or equivalently time offset) is to be factored in to this notion then the formula should also look at the time offset value for the value ($P_{tov}$) of the prediction. In this case the formula changes to look like this:

$$\text{Accuracy}=1-\text{ABS}((P_{tov}-O)/(P_{tov}+O)),$$

where tov represents the time-offset value, and Ptov represents the Prediction at the tov time.

Bias may represent another trust factor element or component, and may optionally be used or not used in the trust factor generation. Where accuracy represents the difference between the prediction and outcome at some point in time it has no interest in understanding the direction of the difference. In other words, whether the difference is positive or negative does not really have an impact to the notion.

Bias on the other hand, is intended to quantify this notion of whether the difference between the recited outcome and the actual outcome is positive or negative. Whether a forecaster tends in their prediction to be overly optimistic or pessimistic is advantageously to be factored in. Referring to the basic example, in the case where the prediction is 11 and the outcome is 10 the forecaster was biased +10%. Alternatively where 9 was predicted they can be deemed to be −10% biased.

In one sense bias may be represented by:

$$\text{Bias}=1-((P-O)/(O)),$$

where P is prediction value, O is outcome value for the same event as the prediction.

Of course, this does not factor in the notion of the time-offset value. If lead-time is to be factored in to this notion then the formula, in at least one embodiment, includes the offset value for the value of the prediction. In this case the formula changes to look like this:

$$\text{Bias}=1-((P_{tov}-O)/(O)),$$

where tov represents the time-offset value.

It stands to reason that if the offset value is used for accuracy it is more than likely to be factored in for bias but this may in fact not always be the case. That said the system could track the offset for each independently if necessary.

Completeness, may be a further (optional) trust factor element or component, and measures the amount of forecast activity within a certain time frame. In actuality, completeness concerns itself with the predicted data within a certain bounded period of time. For example, if you have 10 things you are trying to predict 6 months prior to the outcome you may look at the number of changes or acknowledgments that have been made in say, the most recent 30 days to derive a completeness measurement. In this case, acknowledgement is the act of committing that a forecasted value is still valid without changing the prediction. If the forecaster touches 2 of the 10 possible items then they are deemed to be 20% complete for the 30 day window.

Assuming that for the trust rating system and method to measure trustworthiness, there is a universe of possible things that can be predicted and a time over which they are predicted for. For example, a forecasting system may be forecasting revenue for a given set of products, sold to a given number of customers over a possible number of months. At any point in time a forecaster may either change their prediction or acknowledge that the prediction is still valid.

Attainment may be another optional trust factor element or component. At the point upon reaching the horizon of the time offset for a prediction, another notion can be derived called attainment. Attainment represents how close the prediction actually was to the outcome. For example, if at the time offset point, a sales person predicts that they will sell 100 units of product x in May and in actuality, when May arrives, they sold 120 units, you could say that they achieved 120% attainment. That said, attainment can be expressed as:

Attainment=$(O/P_{tov})\times 10$, where P is prediction, O is outcome and tov represents the time-offset value.

Consistency may be another optional trust factor element or component. Consistency is an expression of attainment and its oscillation over time. A consistent predictor is a person or system that consistently achieves a low standard deviation over a sample set of attainment measurements. For example, Table 1 relates to a sale person forecasting product sales and has been doing so over a 4-quarter period:

TABLE 1

|  | Prediction | Outcome | Attainment | Baseline |
|---|---|---|---|---|
| Qtr 1, 09 | 1100 | 1000 | 90.91% | 100.00% |
| Qtr 2, 09 | 1350 | 1200 | 88.89% | 100.00% |
| Qtr 3, 09 | 1500 | 1400 | 93.33% | 100.00% |
| Qtr 4, 09 | 1250 | 1200 | 96.00% | 100.00% |

The trust rating system and method calculates the attainment in each period as described previously.

As expected, this visualization represents a fairly consistent forecaster. The standard deviation of this data sampling is in fact 3.07%. The following table represents an alternative:

TABLE 2

|  | Prediction | Outcome | Attainment | Baseline |
|---|---|---|---|---|
| Qtr 1, 09 | 1550 | 1000 | 64.52% | 100.00% |
| Qtr 2, 09 | 700 | 1200 | 171.43% | 100.00% |
| Qtr 3, 09 | 2000 | 1400 | 70.00% | 100.00% |
| Qtr 4, 09 | 2000 | 1200 | 60.00% | 100.00% |

It should be clear from above that this forecast is inconsistent and this is reflected a standard deviation of 53.45%.

It may also be appreciated that the inventive system and method contemplates various ways of expressing consistency of data recorded over periods of time and the above examples merely outlines one possible way of doing this.

Normalizing the Elements.

One of the steps in taking the trust factor elements or components and composing or combining them into the Trust Factor is to normalize the measured results. Normalizing is advantageous but not required in all embodiments of the inventive system and method. When it is done, it can be done in a few ways depending on the type of element representation that the trust rating system and method dealing with.

Absolute Capped Percentage.

This is by far the easiest to normalize. If the trust rating system and method knows the percentage from 0 to 100, simple division by 10 will condense the scale to what is relevant to the Trust Factor. Examples of this are Accuracy and Completeness.

Unbounded Positive and Negative Percentage.

In some cases the derived measure for the element cannot be boxed in to a fixed range and in fact can be represented as both positive and negative. In this case the range mapping schema is useful to condense the possible values down to a numeric value between 0 and 10. For example, suppose if the Bias can be from +/−0 to infinity in its percentage representation, the trust rating system and method determines how that is represented as a 0 to 10 value by defining the ranges for each. The table below (Table 3) shows one such mapping.

Once the mapping is done and the mapped value is calculated the absolute value is taken to arrive at our value between 0 and 10. It should be noted that this allows for different mapping for the positive and negative values. It could be the case the −80 percent is mapped to an absolute value of 4 while +80% is mapped to a value of 2.

It can also be the case that for an uncapped positive percentage mapping, as is the case with Consistency, the trust rating system and method would simply not map the negative values at all since they are, in at least one embodiment, impossible for the element.

TABLE 3

| Range | Mapped Value |
|---|---|
| >100% | 0 |
| 90% to 99% | 1 |
| 80% to 89% | 2 |
| 70% to 79% | 3 |
| 60% to 69% | 4 |
| 50% to 59% | 5 |
| 40% to 49% | 6 |
| 30% to 39% | 7 |
| 20% to 29% | 8 |
| 10% to 19% | 9 |
| 0 to 9% | 10 |
| 0% to 9% | −10 |
| −10% to −19% | −9 |
| −20% to −29% | −8 |
| −30% to −39% | −7 |
| −40% to −49% | −6 |
| −50% to −59% | −5 |
| −60% to −69% | −4 |
| −70% to −79% | −3 |
| −80% to −89% | −2 |
| −90% to −99% | −1 |

Weighting the Elements

Now the trust rating system and method has established the multiple elements of trust taken each and correspondingly derived a value from 0-10 for each. In determining the overall Trust Factor for any given thing, in at least one embodiment, various elements are weighted. For example, with regard to trust, elements are weighted in accordance with their relative importance with reference to each other. This may very from one analyzer to the other and so it is such that this is configurable.

By example, if there are 4 trust elements, Accuracy, Bias, Completeness and Consistency, a percentage value is assigned by, for example a user and entered into the trust rating system and method, to each element such that the sum of the percents adds up to 100. This effectively weights each in terms of importance.

TABLE 4

| Element | Percent Weight |
|---|---|
| Accuracy (Ac) | 50% (or 0.50 weight) |
| Bias (Bi) | 30% (or 0.30 weight) |
| Completeness (Cm) | 10% (or 0.10 weight) |
| Consistency (Cn) | 10% (or 0.10 weight) |

In the above example of a particular understanding of trustworthiness, Accuracy and Bias are heavily weighted. The Trust Factor would then be:

Trust Factor=($Ac$×0.5)+($Bi$×0.3)+($Cm$×0.1)+($Cn$×0.1)

More generally:

Trust Factor=Function1{$Ac, W_{Ac}, Bi, W_{Bi}, Cm, W_{Cm}, Cn, W_{Cn}$}, where Function1 is some function of the variables, constants, or other values or parameters enclosed within the { } brackets.

In one non-limiting example, the function is a multiplication between the trust element and the element weighting, and these weighted trust elements are combined in accord with a second functional relationship as follows:

Trust Factor=Function2{($Ac$×$W_{Ac}$),($Bi$×$W_{Bi}$),($Cm$×$W_{Cm}$),($Cn$×$W_{Cn}$)}, where Function2 is some function of the variables, constants, or other values or parameters enclosed within the { } brackets.

In one non-limiting example, the function may combine the four elements, or any combination of one or more elements, in a linear or non-linear manner, and the manner that they are combined may be different for the different elements. In one particular example, they may be added along with the Constant multipliers that may differ between the different elements, and represent an additional weighting.

When the elements are combined by addition, the relationship becomes:

Trust Factor=$C_1$×($Ac$×$W_{Ac}$)+$C_2$×($Bi$×$W_{Bi}$)+$C_3$×($Cm$×$W_{Cm}$)+$C_4$×($Cn$×$W_{Cn}$)

Where:
$C_1$=is a first constant that may be any real number
$C_2$=is a second constant that may be any real number
$C_3$=is a third constant that may be any real number
$C_4$=is a fourth constant that may be any real number
Ac=Accuracy element
$W_{Ac}$=Numerical Weighting of the Accuracy element
Bi=Bias element
$W_{Bi}$=Numerical Weighting of the Bias element
Cm=Completeness element
$W_{Cm}$=Numerical Weighting of the Completeness element
Cn=Completeness element
$W_{Cn}$=Numerical Weighting of the Completeness element Note that any of these weightings may be zero ("0") or zero percent.

If the weightings, constants, and manner of combination are chosen appropriately, then the trust factor may have a resultant numerical value that is between first and second limits. In one non-limiting example, the resulting value is a weighted value between 0 and 10 that represents the Trust Factor for our predicted values. By setting a percent weight to zero, the element is effectively out of play altogether which may be a desired outcome.

It may also be appreciated that in non-limiting examples, it may be advantageous to allow for different things to have different weighting schemes. For example, in a situation where there are two different product lines. One of the two lines may be naturally inconsistent over time, and the factors that influence the first product line are not susceptible to consistent prediction. On the other hand, the second product line is much more consistent naturally. It may be advantageous to weight consistency differently for Trust Factor calculations on each line independently. This differentiation may be true for a variety of different prediction scenarios whether products, services, market behavior, or any other event.

Visualization of the weighting is advantageous, but optional, and when provided is advantageous both for initial setup of the application as well as through analysis of the actual trust information. The manner of generating the visualization and data that supports it as well as the interface are additional features of the technique described here and advances over conventional systems and methods.

Figure 4:
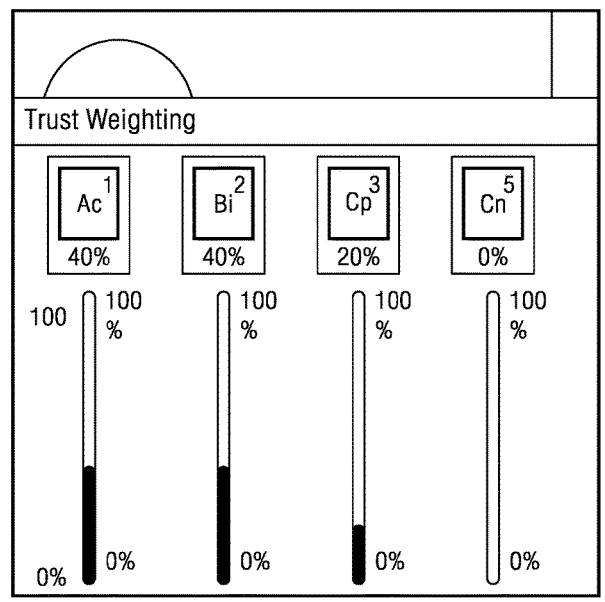
FIG. 4 is an illustration showing an embodiment of a Trust element weighting is be displayed.
Figure 9:
FIG. 9 is an illustration showing an embodiment of an Administration/Configuration user interface (UI) showing one example of a basic trust setup, expressed as a trust model.

FIG. 9 shows an example of the weighting percentages as potentially displayed in a setup UI when a "Trust Model" or configuration is to be established. FIG. 4 depicts the percentage weighting displayed back to a user for context.

Figure 6:
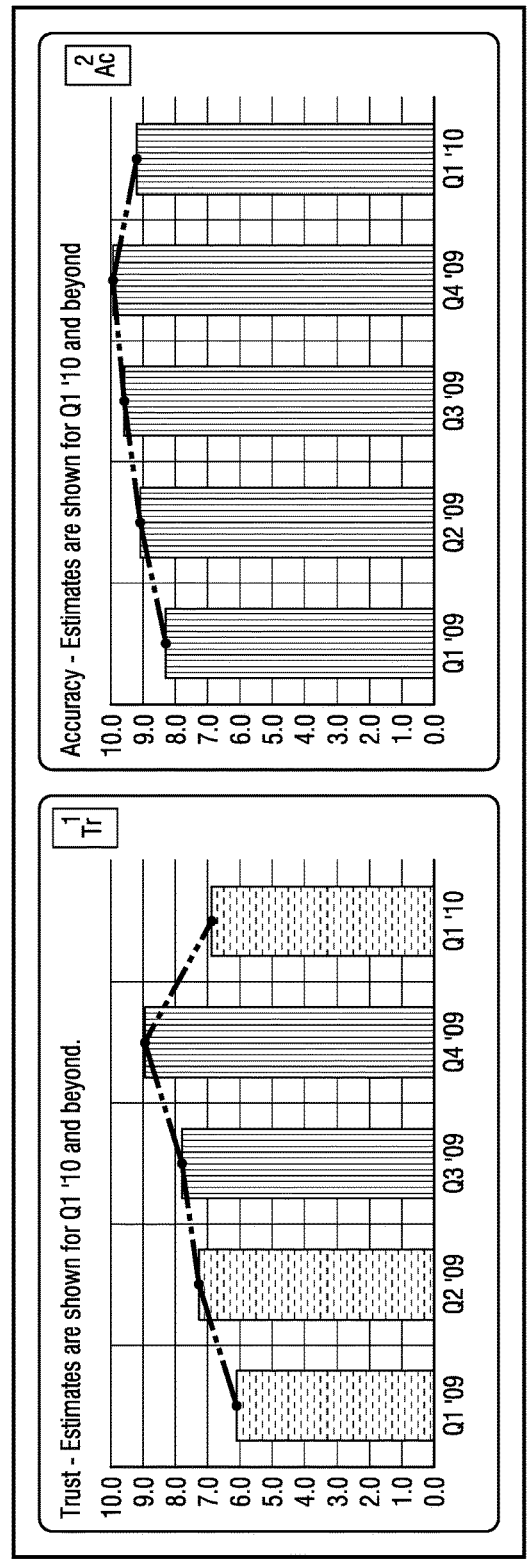
FIG. 6 is an illustration showing an embodiment of a display of the Trust Factor data of a period of time as a trend.
Figure 7B:
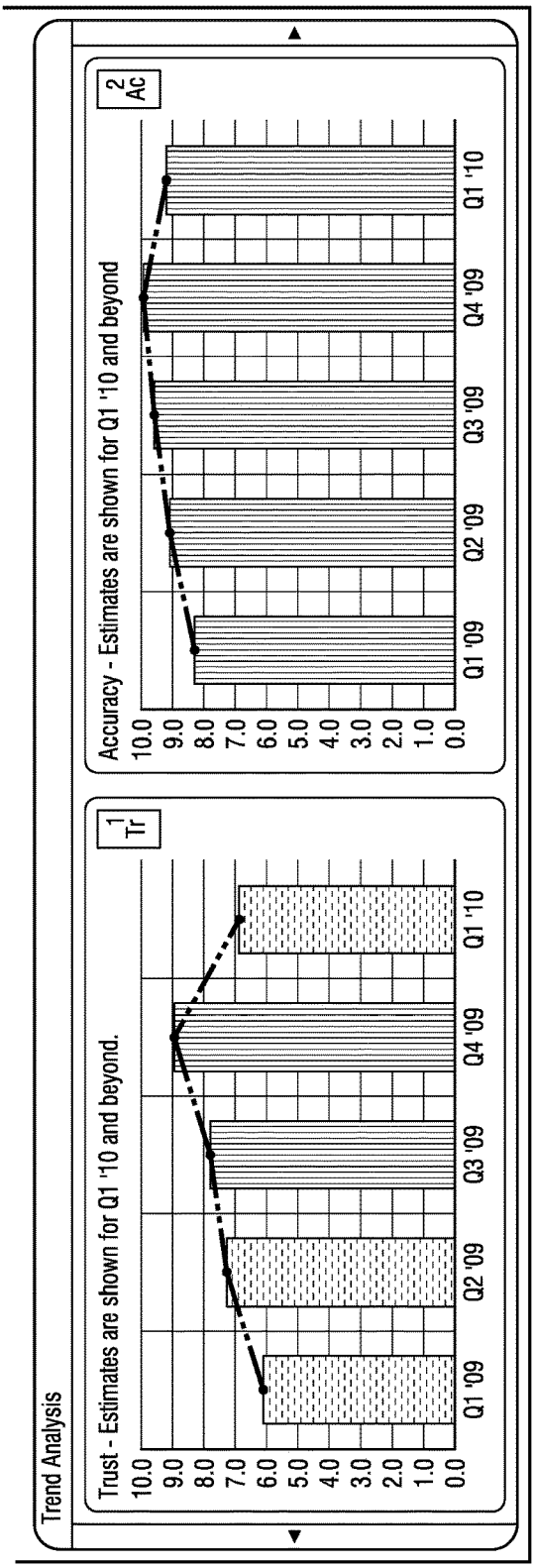
FIG. 7 is an illustration showing a first example of an embodiment of a user interface (UI) embodiment.
Figure 8:
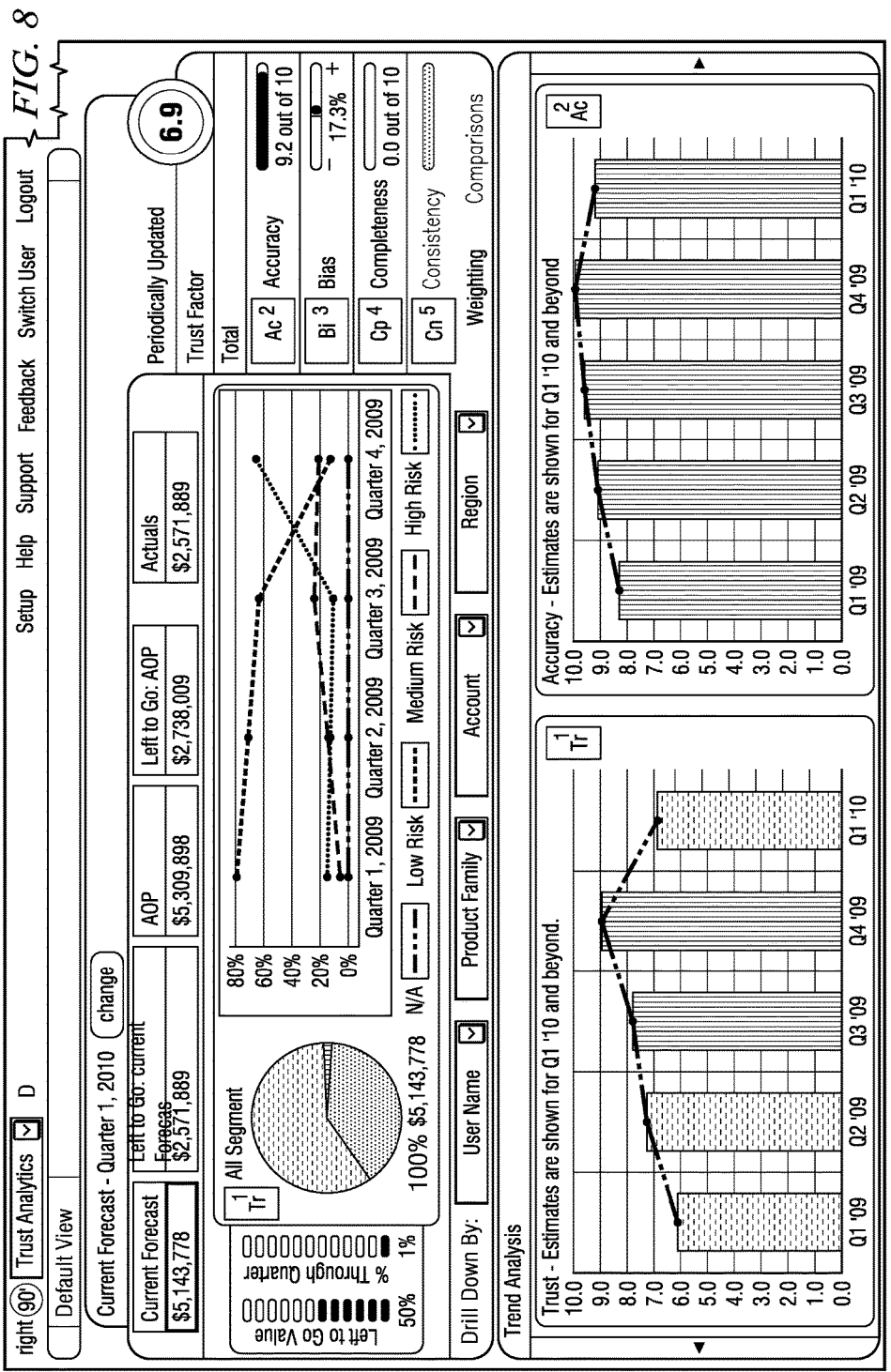
FIG. 8 is an illustration showing a second example of an embodiment of a user interface (UI) embodiment.

Separate to the scoring and weighting of the elements it is critical that each be trended. Taking consistency as an example, if a predictor is inconsistent it would be good to know whether they are at least getting better or worse. This can be achieved by looking at the relative slope of the consistencies normalized score. Taking the slope, another mapping can be introduced to, for example, present the trend in simple terms such as: Slowly getting better, Quickly getting better, neutral, quickly getting worse, slowly getting worse. An example of how this could be displayed in the application can be seen in FIG. 6 where a 4 period historical trend of the Trust Factor as well as the Accuracy element is portrayed.

Additionally, in at least one embodiment, the trust rating system and method use Trust Factor trending to forecast and ascertain the trustworthiness of the trust factor itself. In at least one embodiment, the projected trust factor for the current point in time is as another element for providing judgment. For example, if a forecaster is trending a certain way, the trust rating system and method can, in at least one embodiment, calculate and display the trend and an associated trustworthiness of the forecaster.

Aggregation

In a predictive system it is generally a good idea to organize predicted values into categories to make it easier to capture the information in a meaningful way. By example, in a forecasting system forecast data is advantageously captured along the lines of Customers, Products and/or Regions or combinations of these but not necessarily limited to just those. One term that may be used to describe these categories is dimensions. Organizing the forecasted data into dimensions that may or may not be represented as hierarchies is advantageously used in a forecasting system. When data can be represented as hierarchies and trust or trust factor is applied, and in one example of the system and method, the trust data and trust factor (and/or its component elements) can aggregate up the hierarchies for the purpose of analysis.

For example, for a Regional dimension for which forecast data is captured, it may be the case that Sub-regions roll up into Regions. In this case it is advantageous to be able to look at the Trust Factor rating and associated elements not only at the lower Sub-region level but also at an aggregate Region level as well. FIG. 5 shows a list like view as an example where by the Regional information is displayed as an aggregate view of the children of the Regions dimension or hierarchy.

Segmentation

Figure 10:
FIG. 10 is an illustration showing an embodiment of an Administration/Configuration user interface (UI) showing how segmentation might be presented to a user tasked with setup of the system.

Once data is normalized as mentioned earlier, it may be advantageous to segment the values and assign color representations in a meaningful way. For example, in at least one embodiment, the trust rating system and method assigns the colors red, yellow and green to ranges of values to indicate High, Medium and Low values or segments. FIG. 10 displays an example User Interface (UI) so that these segments are configured and associated colors and descriptive terms are linked to represent the ranges that can then be manifested in the user interface of the application.

In some cases, predicted data that is being measured from trustworthiness can be grouped into the segmentation ranges based on the historical Trust Factor. For example, in a forecasting system you might find a forecast number for a given time period, say a Quarter. Specifically you may have the forecast for Quarter 4, 2001 is 5,000,000 US dollars. Now, this forecast is composed again of categories such as, but not limited to, customers, products and regions and historically, each of these components can be scored with a historical Trust Factor over time. Using this historically tracked Trust Factor you can then look at the revenue, in this case the $5 M, and break the number up into segments represented by the segmentation scheme defined. By example, you could say that 25% of the $5 M is historically "High Risk" or color "Red" based on the segmentation defined for it, while 50% is "Low Risk" or color "Green" based on that segmentation. In at least one embodiment, such data and associations are configurable and flexible in order to handle a variety of scenarios.

Example System Architecture

In reference to a non-limiting example in FIG. 1, in order to satisfy the features and functionality the following is deemed as necessary to provide the described solution. In at least one embodiment, predicted data flow into the system either through the system itself (user interface) or external providers of information. (101) Information is collected into an OLTP database (database engine) organized in such a way to capture the categories and also the predicted values as numeric representations (i.e. units, price, exchange rates, stock prices, etc.) (102) Periodically and based on the specific configuration for how Trust is to be calculated (trust factor calculation engine) as described earlier, processing is done to calculate the Trust Factor ratings, the trust element scores as well as the segmentation information. (103) This information is moved into an analytical system (analytical engine) such as an OLAP repository for aggregation of the information along, for example, the required categories or dimensions or hierarchies. (104) A business logic layer or request layer is placed (logic engine) between the user interface and analytical structures. This layer can handle requests for trust information that is to be provided from the analytical system. (105) Data is fed from the analytical system to the user interface 106 through the business logic layer. The user interface is advantageously provided over a network of computers such as the web with Internet delivery technology but may also be provided in a client/server deliver model over a private network or over the Internet.

Figure 12:
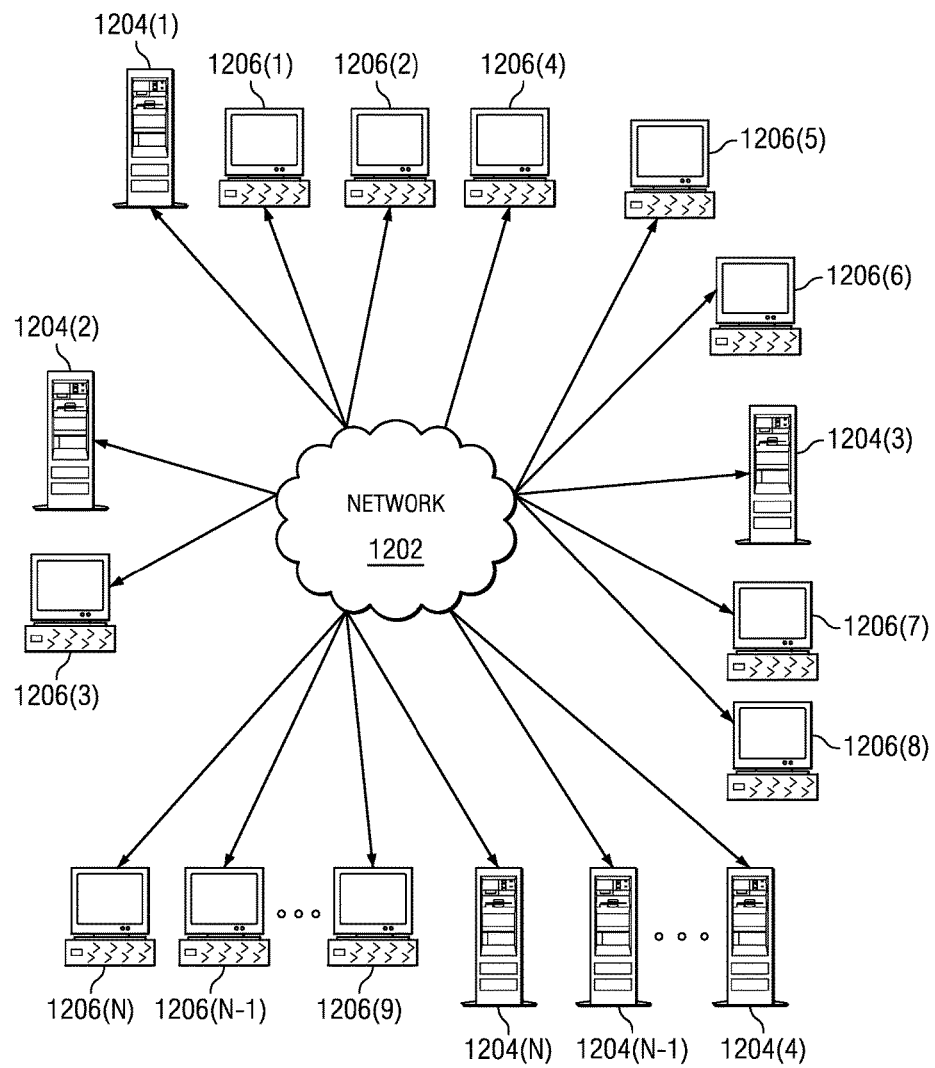
FIG. 12 is an illustration of a network environment in which the trust rating system and method may be practiced.

It may be appreciated that each of the afore mentioned engines may include a processor or processing logic and memory logic coupled with the processor or processing logic for implementing the function of that engine as, for example, illustrated in FIG. 12.

Example Process Flow

FIG. 2 describes a non-limiting example of a typical process flow for how Trust information or the trust factor may be calculated by the trust rating system and method as well how relevant source data is assembled.

In step or process 201, prediction data and outcome data is loaded into the system as a prerequisite but it is not necessarily the case that they are be loaded at the same time. In at least one embodiment, outcome data will lag the predicted data but at the time of Trust Factor calculation both notions exist in the system.

At step or process 202 the trust rating system and method now extracts the configured Trust Elements such as completeness and accuracy in preparation to loop over each for processing.

In a loop each element's associated configuration information is loaded at step or process 203.

At step or process 204 the trust rating system and method determines if the element is enabled or used in the generation of the trust factor either by a status indicator that may or may not be derived from whether or not the element is weighted above 0.

At step or process 205 the trust rating system and method calculates the element and normalize it against the configured scheme.

At step or process 206 the trust rating system and method applies associated segmentation information to the calculated value.

At step or process 207 the trust rating system and method determines whether there are more elements to process. If so repeat, otherwise, the trust rating system and method moves on.

At step or process 208 the trust rating system and method takes all configured elements and calculations and apply appropriate weighting to derive a Trust Factor.

At step or process 209 the trust rating system and method finally aggregates up the associated normalized values along configured category hierarchies for analysis.

A non-limiting example of the trust rating system and method provides a method and model for predicting or forecasting using the trust factor.

FIG. 12 is a block diagram illustrating a network environment in which a trust rating system and method may be practiced. For example, the trust rating system and method can receive data requests and provide data in, for example, web pages to allow trust factors to be displayed. Network 1202 (e.g. a private wide area network (WAN) or the Internet) includes a number of networked server computer systems 1204(1)-(N) that are accessible by client computer systems 1206(1)-(N), where N is the number of server computer systems connected to the network. Communication between client computer systems 1206(1)-(N) and server computer systems 1204(1)-(N) typically occurs over a network, such as a public switched telephone network over asynchronous digital subscriber line (ADSL) telephone lines or high-bandwidth trunks, for example communications channels providing T1 or OC3 service. Client computer systems 1206(1)-(N) typically access server computer systems 1204(1)-(N) through a service provider, such as an internet service provider ("ISP") by executing application specific software, commonly referred to as a browser, on one of client computer systems 1206(1)-(N).

Client computer systems 1206(1)-(N) and/or server computer systems 1204(1)-(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device. One such example computer system is shown in detail in FIG. 13.

Figure 13:
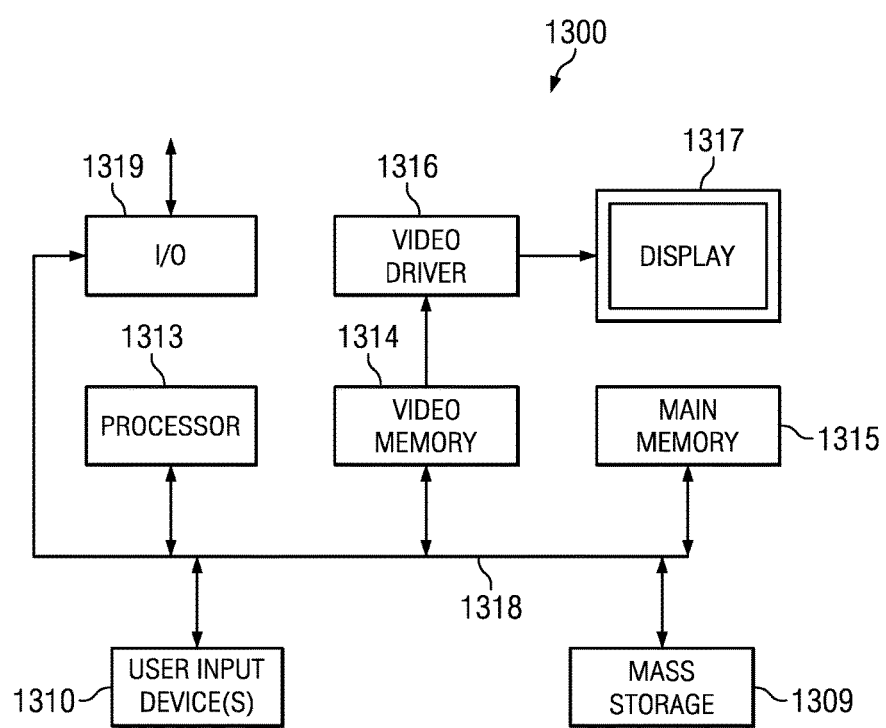
FIG. 13 is an illustration of an exemplary computer system in which the trust factor related system and methods are implemented.

Embodiments of the trust rating system and method can be implemented on a computer system such as a general-purpose computer 1300 illustrated in FIG. 13. Input user device(s) 1310, such as a keyboard and/or mouse, are coupled to a bi-directional system bus 1318. The input user device(s) 1310 are for introducing user input to the computer system and communicating that user input to processor 1313. The computer system of FIG. 13 generally also includes a video memory 1314, main memory 1315 and mass storage 1309, all coupled to bi-directional system bus 1318 along with input user device(s) 1310 and processor 1313. The mass storage 1309 may include both fixed and removable media, such as other available mass storage technology. Bus 1318 may contain, for example, 32 address lines for addressing video memory 1314 or main memory 1315. The system bus 1318 also includes, for example, an n-bit data bus for transferring DATA between and among the components, such as CPU 1309, main memory 1315, video memory 1314 and mass storage 1309, where "n" is, for example, 32 or 64. Alternatively, multiplex data/address lines may be used instead of separate data and address lines.

I/O device(s) 1319 may provide connections to peripheral devices, such as a printer, and may also provide a direct connection to a remote server computer systems via a telephone link or to the Internet via an ISP. I/O device(s) 1319 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1309 until loaded into main memory 1315 for execution. Computer programs may also be in the form of electronic signals modulated in accordance with the computer program and data communication technology when transferred via a network.

The processor 1313, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1315 is comprised of dynamic random access memory (DRAM). Video memory 1314 is a dual-ported video random access memory. One port of the video memory 1314 is coupled to video amplifier 1316. The video amplifier 1316 is used to drive the display 1317. Video amplifier 1316 is well known in the art and may be implemented by any suitable means. This circuitry converts pixel DATA stored in video memory 1314 to a raster signal suitable for use by display 1317. Display 1317 is a type of monitor suitable for displaying graphic images.

The computer system described above is for purposes of example only. The trust rating system and method may be implemented in any type of computer system or programming or processing environment. It is contemplated that the trust rating system and method might be run on a stand-alone computer system, such as the one described above. The trust rating system and method might also be run from a server computer systems system that can be accessed by a plurality of client computer systems interconnected over an intranet network. Finally, the trust rating system and method may be run from a server computer system that is accessible to clients over the Internet.

The trust rating system and method can be implemented as code stored in a non-transitory, tangible computer readable medium and executed by one or more processors.

While the present invention has been described with reference to a few specific embodiments and examples, the description and the particular embodiments described are illustrative of the invention and are not to be construed as limiting the invention. Various modifications may occur to those skilled in the art without departing from the true spirit and scope of the invention as defined by the description and the appended claims. All patents and publications referenced herein are hereby incorporated by reference.

I claim:

1. A method for generating a trust factor indicator based on historical performance the method comprising:
performing using code executed by a processor:
determining an objective historically based prediction accuracy measure, wherein the prediction accuracy measure represents a relationship between a predicted event outcome and an actual event outcome;
determining an objective historically based prediction bias measure, wherein the prediction bias measure represents a positive or negative difference between the predicted event outcome and the actual event outcome;
combining the accuracy measure and bias measure to generate a trust factor indicator;
determining a quantified trustworthiness of forecast data based on the trust factor indicator; and
providing the quantified trustworthiness for display by a computer system.

2. A method as in claim 1, wherein the relationship between the predicted event outcome and the actual event outcome comprises a ratio between (i) a difference of the predicted event outcome and the actual event outcome and (ii) a sum of the predicted event outcome and the actual event outcome.

3. A method as in claim 1, wherein the combining comprises weighting the normalized accuracy measure by an accuracy weighting factor ($W_A$) and weighting the normalized bias measure by a bias weighting factor ($W_B$) before combining.

4. A method as in claim 1, wherein the combining further comprises an additive combination.

5. A method as in claim 1, wherein the accuracy weighting factor ($W_A$) and the bias weighting factor ($W_B$) are each different from zero (0) and different from one (1).

6. A method as in claim 1, wherein the weighting factors are determined for each trust factor so that in combination the total weightings of the normalized values total to 1 or 100 percent so that the trust factor is always a value between 0 and 10.

7. A method as in claim 1 further comprising:
performing using code executed by a processor:
normalizing each of the accuracy measure and bias measure to generate respective normalized accuracy measure and normalized bias measure; and
combining the accuracy measure and bias measure to generate the trust factor indicator comprises:
combining the normalized accuracy measure and normalized bias measure to generate the trust factor indicator.

8. A method as in claim 1, wherein the normalizing comprises applying an absolute capped percentage scaling so that each of the measurements falls in a predetermined range.

9. A method as in claim 1, wherein the normalizing comprises applying an unbounded positive and negative percentage scaling so that each of the measurements falls in a predetermined range with positive and negative values represented by the values in the range.

10. A method as in claim 1, wherein the method further comprises determining a completeness measure and applying the completeness measure in combination with the accuracy measure and the bias measure to generate the trust factor.

11. A method as in claim 1, wherein the method further comprises determining an attainment measure and applying the attainment measure in combination with the accuracy measure and the bias measure to generate the trust factor.

12. A method as in claim 1, wherein the method further comprises determining a consistency measure and applying the consistency measure in combination with the accuracy measure and the bias measure to generate the trust factor.

13. A method as in claim 1, wherein the step of determining an accuracy measure that represents a variance or difference comparison of a future event predicted value (P) of an outcome (value) to the actual event outcome (value) (O).

14. A method as in claim 13, wherein the accuracy measure is unity (=1) (or a value that can be normalized to unity by a multiplier) when the predicted value P is equal to the outcome value O and is less than one when the prediction value differs from the predicted value.

15. A method as in claim 13, wherein the accuracy measure is a magnitude difference D and a predicted value that is greater than the outcome value by +D has the same effect on the accuracy measure as an equal magnitude difference −D.

16. A method as in claim 13, wherein the accuracy is given by the expression:

Accuracy=$A$=Function$\{P,O\}$.

17. A method as in claim 13, wherein the accuracy is given by the expression:

Accuracy=1−ABS$((P-O)/(P+O))$, where P is prediction, O is outcome, and ABS is the absolute value function.

18. A method as in claim 1, wherein the accuracy measure further includes an adjustment for an accuracy time-offset value, the accuracy time-offset value including a factor that effectively increases the accuracy measure for an accurate prediction that is made a time period of t=t2 before the actual outcome relative to an accurate prediction that was made a time period t=t1 before the actual outcome, there the outcome is considered as occurring at t=t0 and t2>t1>t0.

19. A method as in claim 1, wherein the accuracy measure is given by the expression:

Accuracy$_{tov}$=$A_{tov}$=Function$\{P_{tov},O\}$

Where tov represents the time-offset value.

20. A method as in claim 1, wherein the accuracy measure is given by the expression:

Accuracy$_{tov}$=$A_{tov}$=1−ABS$((P_{tov}-O)/(P_{tov}+O))$, where tov represents the time-offset value.

21. A method as in claim 1, wherein the step of determining a bias measure that represents an objective measure of a tendency of a forecast method or a received forecaster forecast input of a predicted outcome value to over-estimate the actual outcome value or to under-estimate the actual outcome value.

22. A method as in claim 21, wherein the bias measure is positive for a bias measure where a predicted value of the outcome value is greater than the actual outcome value, and the bias measure is negative for a bias measure where a predicted value of the outcome value is less than the actual outcome value.

23. A method as in claim 21, wherein the bias measure is greater than a normalized value (e.g., 1 or 100) for a bias measure where a predicted value of the outcome value is greater than the actual outcome value, and the bias measure is less than one for a bias measure where a predicted value of the outcome value is less than the actual outcome value.

24. A method as in claim 21, wherein the bias measure is an additive contribution to the trust factor.

25. A method as in claim 21, wherein the bias measure is a multiplicative contribution to the trust factor.

26. A method as in claim 21, wherein the bias measure is an exponential power contribution to the trust factor.

27. A method as in claim 21, wherein the bias measurement includes a time offset value (tov) adjustment.

28. A method as in claim 21, wherein the bias measure further includes an adjustment for a bias time-offset value, the bias time-offset value including a factor that effectively increases or decreases the bias measure for a prediction that is made a time period of t=t2 before the actual outcome relative to a prediction that was made a time period t=t1 before the actual outcome, there the outcome is considered as occurring at t=t0 and t2>t1>t0, or vice versa.

29. A method as in claim 1, wherein the bias measure time-offset value is a linear function of time before the event.

30. A method as in claim 1, wherein the bias measure time-offset value is a non-linear function of time before the event.

31. A method as in claim 30, wherein the bias measure time-offset value is a function of the time to the end of a fiscal year.

32. A method as in claim 30, wherein the bias measure time-offset value is a function of the time to the end of a sales quarter.

33. A method as in claim 30, wherein the bias measure time-offset value is a function of the time to the end of a forecaster bonus period or forecaster evaluation period.

34. A method as in claim 30, wherein the bias measure time-offset value is a function of the time of year for that particular forecaster from whom the forecast was received.

35. A method as in claim 30, wherein the time-offset value for bias measure is only applied to the trust factor when the time-value offset is applied to the accuracy measure as a contribution to the trust factor.

36. A method as in claim 30, wherein the time-offset value for bias measure is applied to the trust factor independently of whether the time-value offset is applied to the accuracy measure as a contribution to the trust factor.

37. A method as in claim 30, wherein the bias measure is a multiplicative contribution to the trust factor.

38. A method as in claim 30, wherein the bias measure is an additive contribution to the trust factor.

39. A method as in claim 30, wherein the bias measure corrects for a historical bias in a forecast by a forecaster.

40. A method as in claim 1, wherein the step of determining a forecast activity completeness measure that represents an objective measure of a forecast method or a received forecaster activity relative to forecasts made for which an outcome corresponding to the forecast is still pending, and wherein an activity includes one or a combination of (i) reviewing a prior forecast value but leaving it unchanged to thereby validate that it is still a valid prediction, (ii) reviewing a prior forecast value and changing it to reflect an updated or revised prediction to the earlier prior forecast.

41. A method as in claim 40, wherein the completeness measure represents a ratio or factor (or percentage) of the number of pending forecasts that have been validated as compared to the total number of pending forecasts for which the outcome has not yet occurred, where validation is accomplished either by reviewing the forecast and leaving it unchanged or by changing the forecast with implied validation at that point in time.

42. A method as in claim 40, wherein the completeness measure is a function of the ratio of a number of pending forecasts that are validated divided by a total number of pending forecasts as follows:

Completeness=Constant×(number of pending forecasts that are validated/total number of pending forecasts).

43. A method as in claim 40, wherein the completeness measure further includes a time-offset value compensation.

44. A method as in claim 40, wherein the completeness measure is computed for a defined time period prior to the outcome.

45. A method as in claim 40, wherein the time period is a time period for a one-month period preceding the calculation of the completeness measure.

46. A method as in claim 40, wherein the time period is a time period for the calendar month preceding the calculation of the completeness measure.

47. A method as in claim 40, wherein the time period is a time period for the calendar quarter preceding the calculation of the completeness measure.

48. A method as in claim 40, wherein the time period is a time period for a specified number of days, weeks, or months preceding the calculation of the completeness measure.

49. A method as in claim 40, wherein the completeness is modified by a time-offset value.

50. A method as in claim 1, wherein the step of determining an attainment measure that represents an objective measure of how much the predicted outcome value either fell above (exceeded) or fell below (deceeded) the actual outcome value for a forecast, and is determined after the forecasted event has occurred and the outcome value is known.

51. A method as in claim 50, wherein the attainment measure is determined based on the expression:

Attainment=Function{$P,O$}, where P is prediction of the outcome, O is the actual outcome.

52. A method as in claim 50, wherein the attainment measure is determined based on the expression:

Attainment=$(O/P) \times W$, where P is prediction, O is outcome, and W is weighting factor and W is an integer greater than or equal to 1.

53. A method as in claim 50, wherein the attainment measure is modified to include a time-offset value that provides for a higher attainment measure as compared to lower attainment values the further in advance of the determined based on the expression:

Attainment=Function{$P_{tov},O$}, where P is prediction of the outcome, tov represents the time-offset value, and O is the actual outcome.

54. A method as in claim 50, wherein the attainment measure is modified to include a time-offset value that provides for a higher attainment measure for earlier accurately predicted outcomes as compared to attainment values for later accurately predicted outcome values based on the expression:

Attainment=$(O/P_{tov}) \times 10$, where P is prediction, O is outcome and tov represents the time-offset value.

55. A method as in claim 50, wherein attainment measure is an indication of how frequently the forecast predictions are checked for a set of predictions.

56. A method as in claim 50, wherein the attainment is a different measure than the accuracy measure even though both accuracy and attainment measures have a comparison between the predicted value and the actual outcome value.

57. A method as in claim 1, wherein the step of determining a consistency measure that represents an objective measure of how consistently a forecast method or forecaster predicted an outcome value over a period of time of over a set of spaced apart times.

58. A method as in claim 57, wherein the consistency is calculated as a standard deviation of each of the predicted outcomes or attainment measures as compared with a reference outcome or reference attainment.

59. A method as in claim 57, wherein the consistency is calculated according to the expression:

Consistency=Function{attainment,mean value of attainment}.

60. A method as in claim 57, wherein the consistency is calculated according to the expression:

Consistency=Sigma=SQRT{[(attainment$_1$−mean value of attainment)$^2$+ . . . +(attainment$_N$−mean value of attainment)$^2$]/$N$}.

61. A method as in claim 57, wherein the standard deviation is the square root of its variance and indicates how much variation there is from the average (or mean) value of the outcome or of the attainment measure.

62. A method as in claim 1, wherein the method further comprises including a trending element in the generation of the trust factor.

63. A method as in claim 1, wherein the method further comprises including an aggregation into the generation of the trust factor and using this in a trust analysis.

64. A method as in claim 1, wherein the method further comprises including a segmentation into the generation of the trust factor and using this in a trust analysis.

* * * * *